F. J. SCHLINK.
SCALE BEAM.
APPLICATION FILED SEPT. 14, 1917.
1,251,584. Patented Jan. 1, 1918.
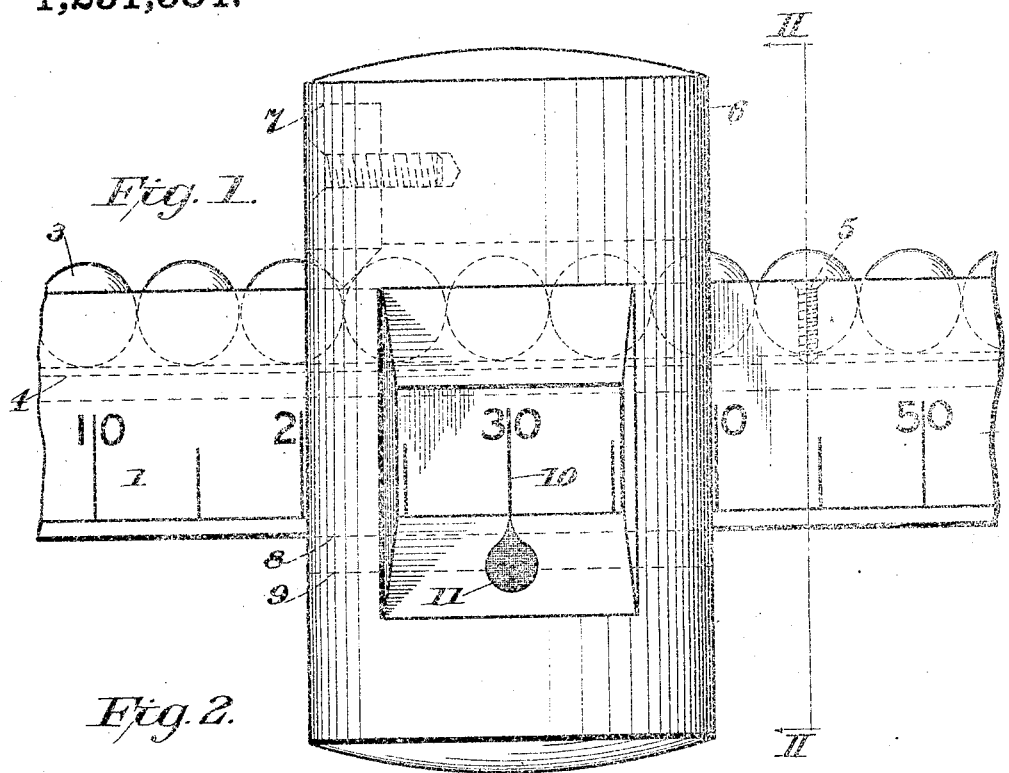
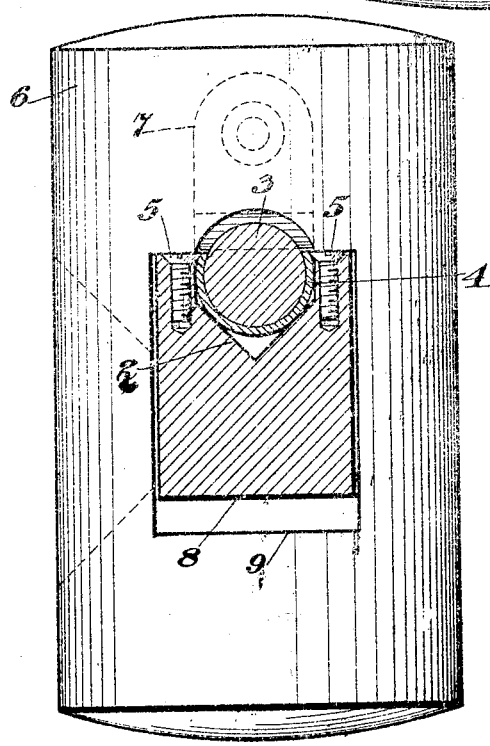
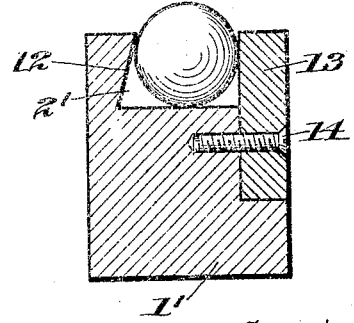
Inventor
Frederick J. Schlink

UNITED STATES PATENT OFFICE.

FREDERICK J. SCHLINK, OF WASHINGTON, DISTRICT OF COLUMBIA.

SCALE-BEAM.

1,251,584.    Specification of Letters Patent.    Patented Jan. 1, 1918.

Application filed September 14, 1917. Serial No. 191,411.

(DEDICATED TO THE PUBLIC.)

*To all whom it may concern:*

Be it known that I, FREDERICK J. SCHLINK, a citizen of the United States, and an employee of the Bureau of Standards, United States Department of Commerce, a legal resident of the State of Illinois, residing at the city of Washington, in the District of Columbia, (whose post-office address is 1426 M street, N. W.,) have invented new and useful Improvements in Scale-Beams, and have made application by petition of even date herewith, under the act of March 3, 1883, chapter 143, (22 Stat., 625,) praying that Letters Patent therefor may be granted to me.

The invention herein described and claimed may be used by the Government of the United States or by any of its officers or employees in the prosecution of work for the United States, or by any person in the United States, without payment of any royalty thereon.

The following is a specification of the invention:

My invention relates to an improved method for providing accurately spaced notches on the weigh-beams of scales. It provides for the use of simple elements of high accuracy, of low first cost and easy replaceability, and it eliminates all necessity for empirical correction at individual notches, as has been required in the past on all weighing scales having a high capacity represented in the travel of the sliding poise.

In the ordinary method of notching the weigh-beams of scales, adjustment of the notches is a matter of difficulty and it has been impossible to form such notches accurately enough by the available machine tools, to obtain that precision required to give the necessary accuracy of weight indication for all scales having high capacity indicated by the motion of the sliding poise, as referred to above. For this reason, it has become customary individually to adjust the notches, oftentimes 300 or more in number. That process, which is necessarily slow and expensive, is entirely avoided by the construction shown in this invention.

In my invention a number of balls are employed, so arranged in a channel or groove as to be retained in a straight line defined by such channel or groove, and to have their contiguous surfaces forced into mutual contact along that line. (It is to be understood that slight deviations from true straightness in the groove or trough will only to a slight degree affect the distance between centers of the balls.) The sliding poise is provided with a projection or dog engaging with the upper surfaces of the balls and adapted to be raised out of engagement at such times as the poise is moved longitudinally on the beam, by lifting the poise relatively to the beam on which it slides. By this construction, the upper hemispheres of the balls in the row form a system of notches by means of which the position of the poise, through co-action of its dog with the ball surfaces, is determined.

As is well known, commercial metallic balls of the sort used in ball bearings are, within a given lot, extremely accurate as to diameter and sphericity; furthermore, such balls are purchaseable at a low price and by virtue of the high accuracy referred to, provide perhaps the most accurate single machine element possible to produce.

The nature, characteristic features and scope of my invention will be more readily understood by the following description taken in connection with the accompanying drawings.

In the drawings: Figure 1 is an elevation of a portion of a typical weigh-beam with an applied poise embodying my invention. Fig. 2 is a transverse section of the same weigh-beam with an applied poise, this section being taken at the plane II—II. Fig. 3 represents in section another method than that of Fig. 2 for holding and alining the balls forming the notch system. Referring more particularly to the drawings: 1 indicates the weigh-beam, comprising the usual graduations. The weigh-beam contains a groove 2 in which are located in contact and along a straight line a series of balls 3 comprised within a quasi-tubular envelop 4, which may be simply constructed by milling away a portion of the periphery of a suitable metallic tube, and is held in position within the beam 1 by means of suitable screws 5. The poise 6 is recessed to receive the dog 7, fixedly attached thereto, having a wedge-shaped lower end projecting downwardly between the ball surfaces, as shown in the dotted lines of Fig. 1. Clearance is provided between the surfaces 8 and 9 to allow of the poise being lifted sufficiently to permit of motion of the tip of the dog past the upper surfaces of the balls, so that by so lifting the poise it may be moved freely along the beam and located by engagement of the dog with the desired notch. 10 represents one of the graduations of the beam suitably disposed in relation to the position of the corresponding notch. Opposite 10 is seen the fiducial mark 11 providing for the reading of the weight indications of the scale. A suitable closure is provided at each end of the tubular element described, to prevent endwise motion of the system of balls. When desirable or expedient this closure may be of an elastic or spring-actuated type to provide for differential expansion of the balls as against the tubular structure.

In Fig. 3 in which 1' represents the beam in transverse cross-section, the securing of the balls in line is attained by a different means. An angular groove 2' is cut, in vertical height slightly greater than the radius of the balls to be used. One of the lateral faces of this groove is inclined, as shown at 12, while the row of balls is pressed from the opposite side by a plate-shaped piece 13, which forms the opposing lateral face, and is retained in place and forced into engagement with the ball system by the screws 14. By this means the withdrawal or loss of the balls is prevented and their collinearity is provided for.

Although but one specific embodiment of this invention has been here shown and described, it will be understood that numerous details of the construction shown may be altered or omitted without departing from the spirit of this invention, as is defined by the following claim:

A scale-beam having a series of balls arranged fixedly in a row longitudinally of the beam and affording by the gaps between adjacent balls at one side of their common line of closest approach, notches which serve to establish the several positions of the poise along the beam.

Signed at Washington, D. C. this 13th day of September, 1917.

FREDERICK J. SCHLINK.

Witnesses:
V. L. LOWE,
THEODORA C. BAILEY.